(12) United States Patent
Touchton et al.

(10) Patent No.: US 6,271,757 B1
(45) Date of Patent: *Aug. 7, 2001

(54) SATELLITE ANIMAL CONTAINMENT SYSTEM WITH PROGRAMMABLE BOUNDARIES

(75) Inventors: Scott F. Touchton, Pottstown; Richard D. Mellinger, Radner; Donald L. Peinetti, Chester Springs, all of PA (US)

(73) Assignee: Invisible Fence, Inc., Malvern, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/358,622

(22) Filed: Jul. 21, 1999

Related U.S. Application Data

(63) Continuation-in-part of application No. 08/995,084, filed on Dec. 19, 1997, now Pat. No. 6,043,748.

(51) Int. Cl.[7] .................................................. G08B 23/00
(52) U.S. Cl. ..................................... 340/573.1; 340/573.3; 340/573.4; 340/539; 340/825.49; 340/825.54; 119/721; 119/908
(58) Field of Search .............................. 340/573.1, 573.3, 340/573.4, 539, 825.49, 825.54, 573.2; 119/721, 908, 720, 859; 342/357, 457

(56) References Cited

U.S. PATENT DOCUMENTS

| 5,791,294 | * | 8/1998 | Manning | 119/721 |
| 5,868,100 | * | 2/1999 | Marsh | 119/421 |
| 6,043,748 | * | 3/2000 | Touchton et al. | 340/573.3 |

* cited by examiner

*Primary Examiner*—Nina Tong
(74) *Attorney, Agent, or Firm*—Duane Morris & Heckscher LLP

(57) ABSTRACT

An electronic containment system using positional satellites is provided for controlling the movement of animals relative to a selected confinement area. A portable programming transceiver is used to program the boundary of a selected confinement area as the device is moved along such boundary. A programmable collar transceiver worn by the animal provides GPS signals from the satellite to a remotely located control station. The control station tracks the movement of the animal relative to the boundary. If the animal crosses the boundary, the station transmits a stimulus activation signal to the collar so that a corrective stimulus may be produced for the animal. Tracking and containment of objects are accomplished by providing GPS-defined, user-programmable containment areas.

32 Claims, 4 Drawing Sheets

SATELLITE ANIMAL CONTAINMENT SYSTEM WITH PROGRAMMABLE BOUNDARIES

RELATED APPLICATIONS

This application is a continuation-in-part of U.S. application Ser. No. 08/995,084, filed Dec. 19, 1997 now U.S. Pat. No. 6,043,748 entitled Satellite Relay Collar and Programmable Electronic Boundary System For The Containment of Animals, incorporated herein by reference.

FIELD OF THE INVENTION

This invention relates generally to an electronic tracking and containment system for, but not limited to, animals and more specifically to an improved electronic containment system using positional satellites such as the GPS (Global Positioning System) in conjunction with a portable programming transceiver, a programmable collar transceiver, and a remotely located control station.

BACKGROUND OF THE INVENTION

Conventional electronic animal containment systems have a subterranean transmission antenna shaped to define fixed boundaries of a confinement area. The transmission antenna transmits a unique electromagnetic signal which is received by a collar transceiver having a radio frequency receiver. The collar transceiver is typically attached to the neck of an animal and is used to stimulate that animal to, among other things, encourage or discourage certain behavior such as movement.

Electronic animal containment systems that can be installed with minimal disruption of the landscape and readily reconfigured to redefine the confinement area are in great demand. In the current practice, the installation of a subterranean transmission antenna requires excavation of the confinement area boundary which can entail disruption of plant root systems, damaging surrounding grass, flower beds and the like. Additionally, the installation may be hindered by obstacles such as trees, concrete walkways, and driveways.

Beyond installation difficulties, the fixed location of the subterranean transmission antenna inhibits future alteration of the confinement area. Redefinition of the confinement area is advantageous as confinement needs change with, for example, the introduction of new animals or changes to the landscape. Moreover, at present, electronic animal containment systems are generally permanent to the location on the property in which the antenna is installed. This permanency denies its availability for use when traveling and can necessitate the purchase of an additional system upon relocation given the impracticality of excavating and salvaging an installed system.

Consequently, satellite global positioning systems which can be used to dynamically define a confinement area and also track animals are desirable for use in animal containment systems. An animal containment system based on the GPS obviates the need for the fixed subterranean antenna and eliminates the aforementioned disadvantages of the buried antenna.

SUMMARY OF INVENTION

The present invention provides a satellite animal containment system that is not constrained to fixed confinement boundaries. The system provides a portable programming transceiver, or alternately a collar transceiver, each in communication with the global positioning system (GPS) for the purpose of programming one or more alterable confinement boundaries. The system may be used to program an outer perimeter boundary, such as around a yard, as well as internal exclusion zones, such as around gardens or swimming pools.

In a preferred embodiment, a portable programming transceiver receives a GPS signal representative of the transceiver's coordinates and transmits these coordinates to a remotely located control station. These coordinates are used by the control station to define a point on the boundary of a confinement area. The portable programming transceiver is moved along the perimeter of the confinement area and continually transmits additional coordinates to the control station thus contiguously defining the boundary of the confinement area. By this method the boundary is represented by any closed curve, often a simple closed curve, in addition to conventional rectilinear shapes. The area outside the boundary is designated as an exclusion area and the area within the boundary is designated as a permissible area, i. e. the confinement area. Optionally, additional boundaries may be defined within the established confinement area to create the inside exclusion zones through selected use of the portable programming transceiver. Further, a collar transceiver, attached to an animal, receives a separate GPS signal representative of the collar transceiver's coordinates. These coordinates are transmitted to the control station where they are compared to the definition of the confinement area. When the collar transceiver's location is a determined to be too close to any boundary associated with the confinement area, a signal is transmitted by the control station to the collar transceiver which activates a stimulus generator, located in the collar transceiver, to correct the animal. The stimulus may be applied based on additional factors such as animal velocity toward a boundary as well as proximity to the boundary. Accordingly, the application of a stimulus may not be exclusively dependent on relative animal position to a boundary alone. For example, an animal that is asleep, or otherwise not moving, at a location within three feet of a boundary may not require any stimulus at all, whereas an animal moving at a rapid rate of speed toward the boundary at a location within three feet of the boundary may require an immediate stimulus to deter further movement toward the boundary.

In an alternate embodiment, the portable collar transceiver, prior to being attached to the animal, may be used in a programming mode, instead of using a separate programmable transceiver, to define the boundary of a confinement area in a manner similar to that of the portable programming transceiver. That is, when operated in a boundary programming mode, the collar transceiver receives a GPS signal representative of the transceiver's coordinates and transmits these coordinates to a remotely located control station. These coordinates are used by the control station to define a point on the boundary of the confinement area. The collar transceiver is moved along the perimeter of the confinement area, such as a yard, and continually transmits additional coordinates to the control station thus contiguously defining the boundary of the confinement area. By this method the boundary may be represented by any closed curve, often a simple closed curve, in addition to conventional rectilinear shapes. The area outside the boundary is designated as an exclusion area and the area within the boundary is designated as a permissible area, i. e. the confinement area. Optionally, additional inside boundaries may be defined within the established confinement area to create further inside exclusion zones, such as around a flower garden. The collar transceiver is then switched out of programming mode and into its operational mode. The collar is placed on the animal, where it functions in conjunction with the control station for the purpose of generating a stimulus when the animal approaches an exclusion area boundary.

BRIEF DESCRIPTION OF THE DRAWINGS

The foregoing summary, as well as the following detailed description of the preferred embodiments of the present invention, will be better understood when read in conjunction with the accompanying drawings in which.

DETAILED DESCRIPTION OF THE PREFERRED EMBODIMENTS

Figure 1:
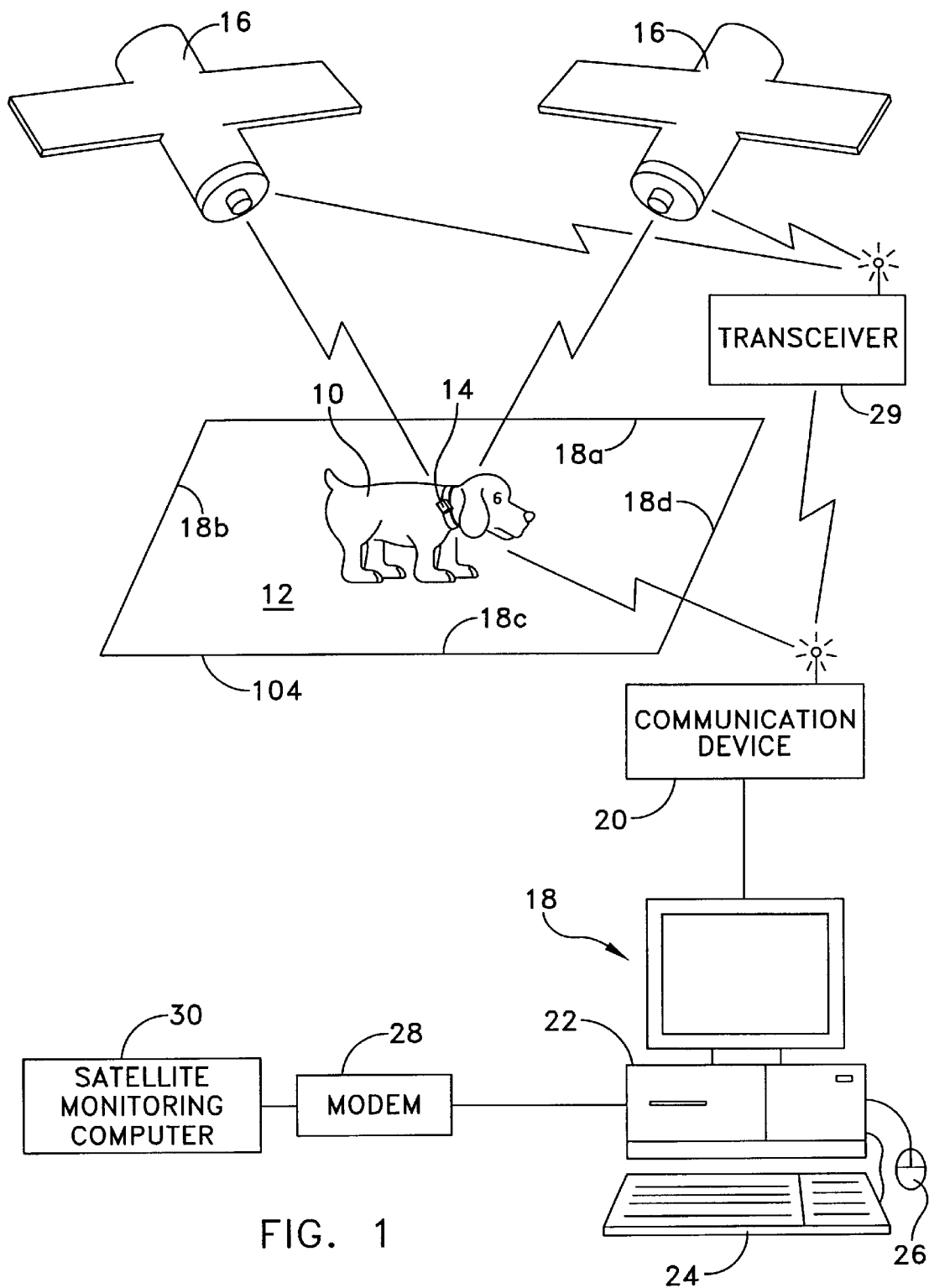
FIG. 1 is a schematic diagram of the satellite animal containment system.

An electronic containment system 18 is provided for tracking the movement of an animal 10, such as a dog, relative to a selected confinement area 104 such as along lines 18a, 18b, 18c, and 18d of FIG. 1. The confinement area is defined using a portable programming transceiver 29. The programming transceiver 29 receives a GPS signal from which the transceiver's coordinates can be determined. The programming transceiver computes its coordinates from the GPS signal and transmits these coordinates to the remotely located control station 18. Alternatively, the programming transceiver may function to transmit the original GPS signal, or a portion thereof, to the remotely located control station 28, which computes the coordinates of the programming transceiver. The coordinates are stored by the control station 28 to define a point on the boundary of the confinement area. Additional coordinates are generated as the programming transceiver 29 is moved along the boundary of the confinement area, and the additional coordinates are stored in the control station thus defining the boundary of the confinement area. The coordinates may be transmitted continually, in real time, to the remotely located control station or may be stored in the programming transceiver and subsequently downloaded to the remotely located control station.

A collar transceiver 14, attached to the animal, receives a GPS signal representative of the collar transceiver's coordinates. The collar transceiver transmits the coordinates to the control station 18 where they are compared to the programmably defined confinement area. If the control station 18 determines the collar transceiver's location to be within a predetermined distance from the boundary of the confinement area, a signal is transmitted by the control station 18 to the collar transceiver 14 which activates a stimulus generator located in the collar transceiver. A stimulus, such as an audible tone or mild shock, is delivered to the animal to correct the animal.

PROGRAMMING OF BOUNDARIES

Figure 3:
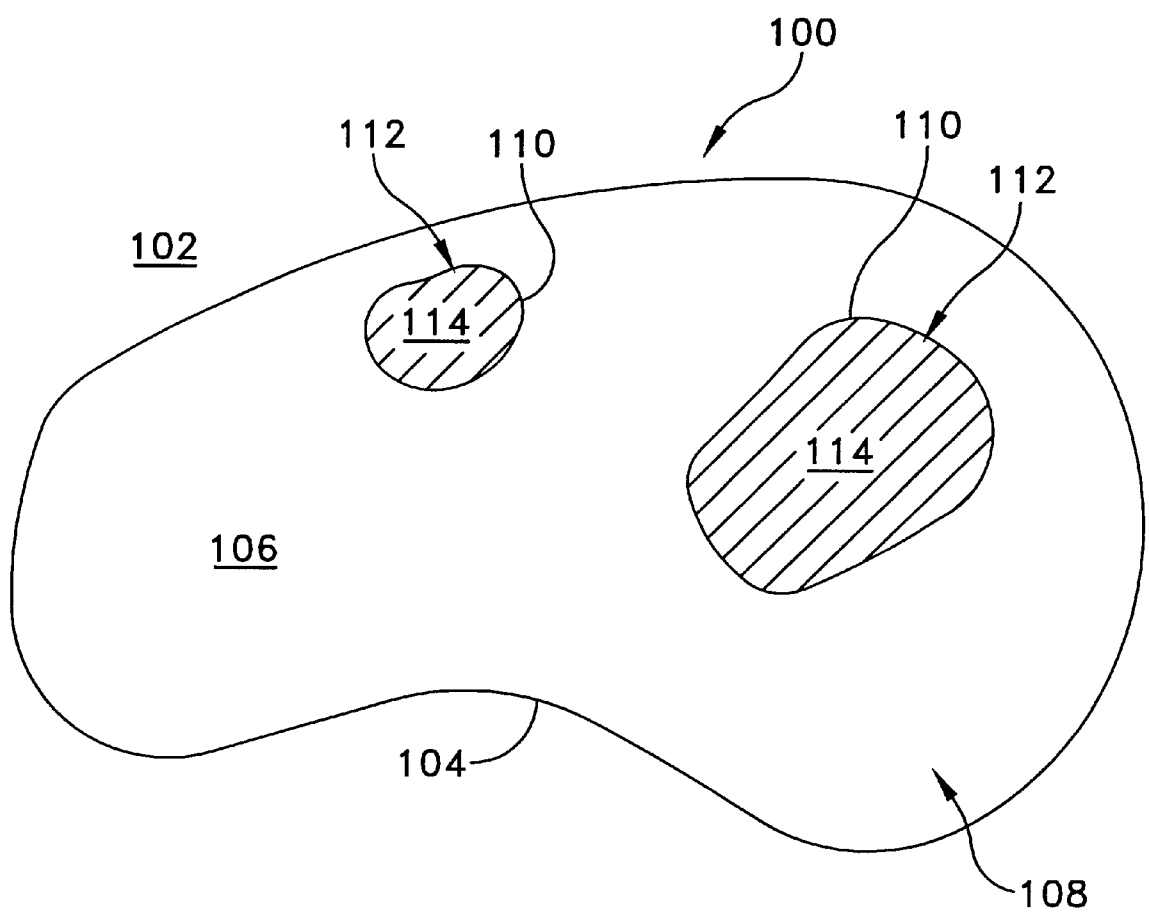
FIG. 3 is a schematic diagram of the overall confinement geometry having multiple exclusion regions.
Figure 4:
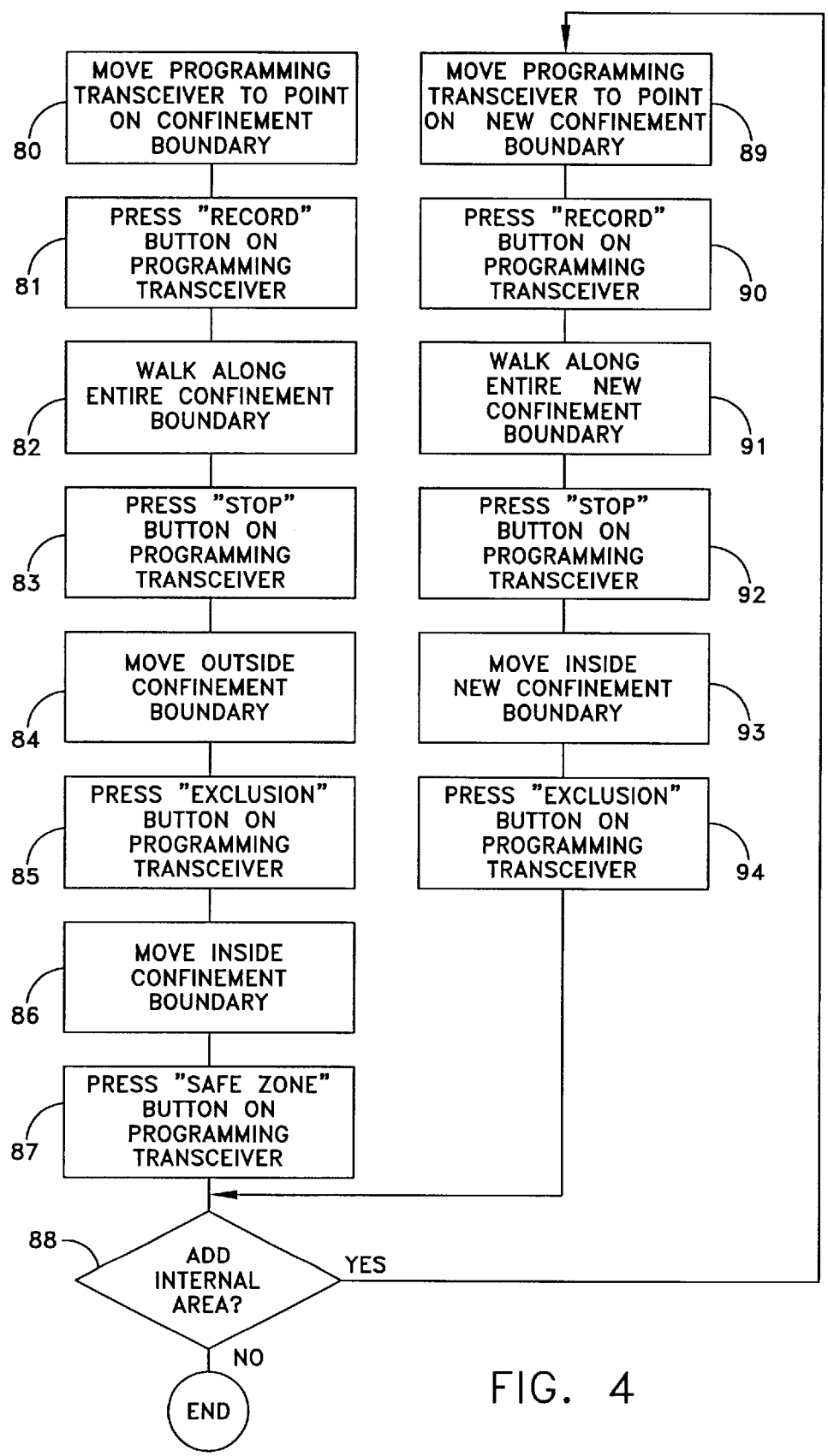
FIG. 4 is a flow chart of the confinement area definition process of the satellite animal containment system of FIG. 1.

Referring now to FIGS. 1, 3, and 4, in a preferred embodiment, the programming transceiver is a portable programming transceiver 29 used to define an overall confinement geometry 100. The portable programming transceiver 29 incorporates a receiver for receiving GPS signals from a GPS source, such as positional satellites 16. The portable programming transceiver 29 computes its coordinates from the GPS signal and transmits the coordinates to a remotely located control station 18. The remotely located control station 18 defines a point on the boundary 104 of a main confinement area 108, as schematically shown in FIG. 3, corresponding to the coordinates of the portable programming transceiver 29. The portable programming transceiver 29 is moved along the boundary 104 of the confinement area 108 where the portable programming transceiver 29 continually transmits additional coordinates to the remotely located control station 18, contiguously defining the boundary 104 of confinement area 108. The external area 102 outside of boundary 104 is designated as an exclusion area, and the area within the boundary 104 of confinement area 108 is designated as a permissible area. Optionally, the portable programming transceiver 29 may be used so that additional boundaries 110 may be defined inside the established confinement area 108 to create further inside exclusion regions 112.

For example, to begin the definition of the confinement area 108, an operator moves to a point on the main boundary 104, at step 80 of FIG. 4, and presses a "Record" button on the portable programming transceiver 29, at step 81. A GPS signal representing the portable programming transceiver's 29 coordinates is transmitted to the remotely located control station 18 via communication device 20 of the control station 18. The remotely located control station 18 stores this location in memory. The operator walks along the boundary 104 of the confinement area 108, at step 82, and the portable programming transceiver 29 continually transmits its coordinates to the remotely located control station 18 to provide a path or line of coordinates. The remotely located control station 18 stores the coordinates in memory and defines a curve corresponding to the path traversed by the operator, i. e. the boundary 104. After the boundary 104 has been traversed, the operator presses a "Stop" button on the portable programming transceiver 29, at step 83. The remotely located control station 18 stops recording the coordinates of the portable programming transceiver 29. The operator steps outside of the confinement area 108 into external area 102, at step 84, and presses an "Exclusion" button on the portable programming transceiver 29, at step 85. The remotely located control station 18 defines external area 102 as an area of exclusion in which the animal is not permitted. The operator steps inside the boundary 104, at step 89, and presses a "Safe Zone" button on the portable programming transceiver 29, at step 87. The remotely located control station 18 defines the internal area 106 as a non-correction zone where the animal is permitted. In an alternate embodiment, the control station may be programmed to automatically define an area outside of the initial boundary 104 as an exclusion zone and the area inside as a permissible zone.

Optionally, at step 88, the operator may provide additional inside exclusion regions 112 located within confinement area 108. When desired, the operator walks to a selected boundary of an inside exclusion region 112, such as a rose garden, within the confinement area 108, at step 89, and presses the "Record" button, at step 90. The operator walks along the desired inside boundary 110 of the inside exclusion region 112 while the portable programming transceiver 29 continually transmits its coordinates to the remotely located control station 18, at step 91. The remotely located control station 18 stores the coordinates in memory and defines a curve corresponding to the path traversed by the operator, i. e. the inside exclusion boundary 110. The operator presses the "Stop" button after completing one circuit, at step 92. The operator moves into the exclusion area 114, at step 93, and presses the "Exclusion" button, at step 94. The remotely located control station 18 defines the inside exclusion region 112 as an area 114 in which the animal is not permitted. Multiple inside exclusion areas 112 may be selectively defined in a similar manner.

In another embodiment of the present invention, a programming transceiver may be provided on or as an integral part of the programmable collar transceiver 14. The programmable collar transceiver 14 may function to configure a set of confinement boundaries 104 and, optionally, the exclusion boundary 110, when operating in a Program Mode. The programmable collar transceiver 14 includes a receiver for receiving a GPS signal. Programming of the confinement area 108 and optional inside exclusion regions 112 follows the above procedure using the portable collar transceiver 14 in the place of the portable programming transceiver 29. However, in order to minimize the weight and size of the collar, the use of the separate programming transceiver 29 may be preferred in various applications.

In yet another embodiment, the remotely located control station 18 may be programmed directly. In one specific example, the remotely located control station 18 includes a personal computer 22, where latitude and longitude coordinates defining the boundaries 104 of the confinement area 108 and the inner exclusion boundaries 110 of the inside exclusion regions 112 may be entered via keyboard 24, mouse 2, or other known input devices. For instance, the remotely located control station 18 may comprise a graphic display having an input for data entry that allows the overall confinement geometry 100 to be entered by drawing on the screen.

The remotely located control station 18 stores the confinement geometry 100, including boundaries 104 and 110, as a configuration file in either volatile or non-volatile memory. A plurality of configuration files each defining an overall confinement geometry 100 may be created and stored for use with different animals or different confinement locations. In a preferred embodiment, data configuration files are stored on non-volatile memory media, such as floppy disks, cd-roms, etc., for use with the collar transceiver 14 at alternate locations equipped with a remotely located control station 18. Accordingly, a first selected confinement geometry may be used for one pet, while a different confinement geometry is simultaneously used for another pet at the same time and the same location. Similarly, a first selected confinement geometry may be used when the pet is home and a second confinement geometry may be selected for use at a vacation home.

SYSTEM OPERATION

As shown in FIG. 1, an outer boundary 104 encloses an area 12, such as a yard, occupied by an animal 10, such as a dog. The animal 10 is equipped with a collar transceiver 14 which includes reception circuitry and transmission circuitry, preferably battery operated. The reception circuitry receives GPS signals from a GPS source, such as positional satellites 16, as well as update and stimulus signals from the remotely located control station 18. The transmission circuitry of the collar relays positional satellite data to the remotely located control station 18.

The positional satellites 16 transmit precise positional information to the collar transceiver 14. When the distance between the collar transceiver 14 relative to three positional satellites 16 is known, the collar transceiver 14 can be located utilizing the three dimensional Pythagorean theorem. The distance from the collar transceiver 14 to the positional satellites 16 is determined by calculating the time between the GPS signal broadcast and collar transceiver 14 reception. Each positional satellite 16 signal includes a unique (PN) pseudonoise sequence so the collar transceiver 14 can differentiate between various positional satellites 16 and account for their specific orbital movement.

This positional information is relayed at a variable rate or preset rate by collar transceiver 14 at a selected radio frequency to the remotely located control station 18 via the RF communications device 20. The frequency of the signal transmitted by the collar transceiver 14 to the remotely located control station 18 can be different from the frequency of the signal received by the collar transceiver 14 from the positional satellites 16. The remotely located control station 18 determines the location and ground speed of the animal 10 equipped with the collar transceiver 14 relative to the programmed confinement area boundaries 104 and inside exclusion boundaries 110.

Figure 2:
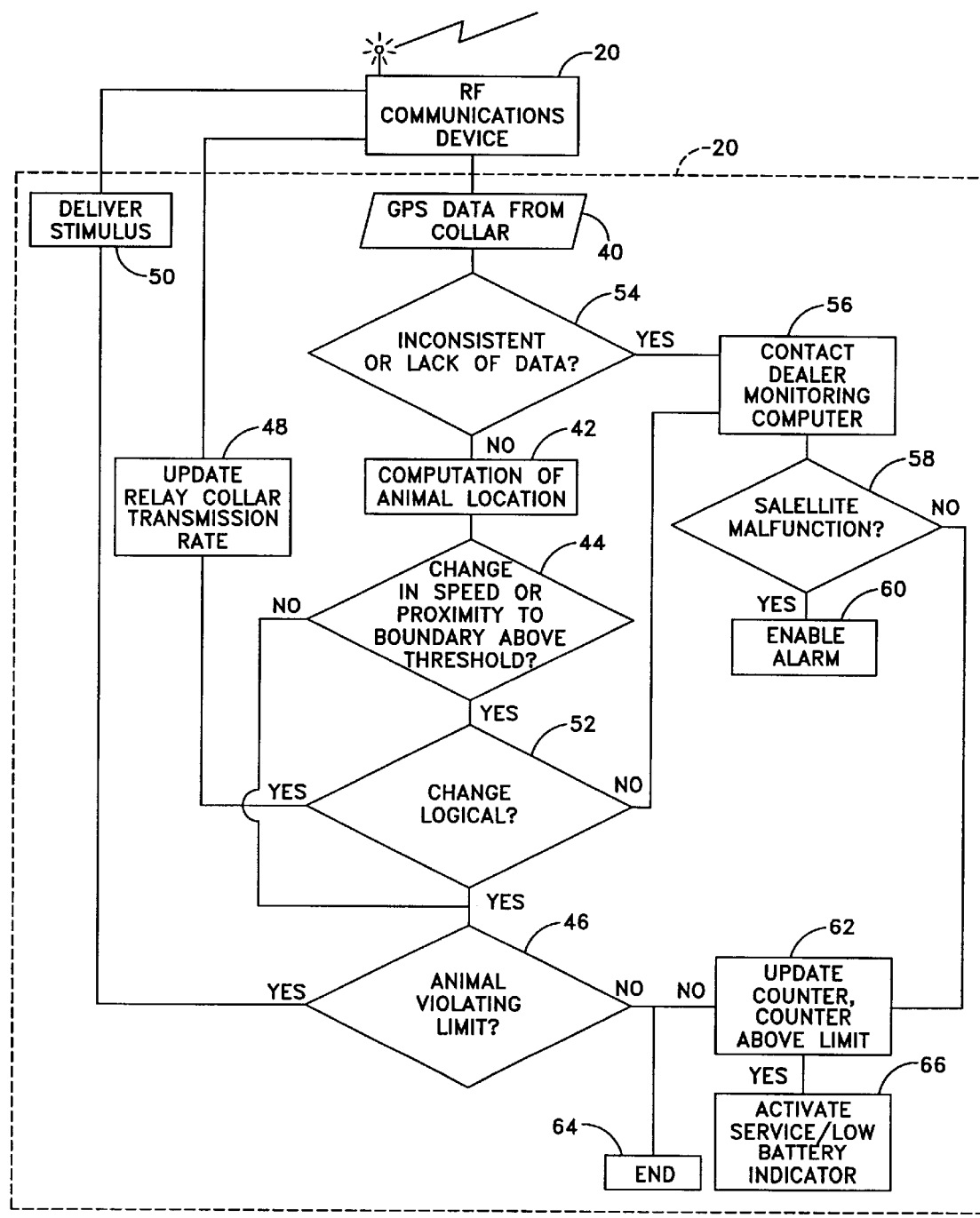
FIG. 2 is a flow chart of the data processing function of the satellite animal containment system of FIG. 1.

Referring now to FIG. 2, the collar transceiver 14 periodically relays positional GPS satellite data as received from positional satellites 16 at a variable relay rate or preset rate, via RF transmissions, to the remotely located control station 18 as shown in step 40. At step 54, the system checks whether readable, usable data is being received in which event the system progresses to step 42 or whether there is inconsistent data or a lack of data in which event the system progresses to step 56. The rate of transmission of the relay information is either preset or determined by the speed of the animal 10 as calculated by the remotely located control station 18. In the case of a preset rate, steps 44 and 48 of FIG. 2 are bypassed. In a preferred embodiment, as an animal 10 moves within the boundary 104, the system computes the animal location at step 42 relative to boundaries 104 and 110. As the animal moves, the system also determines the velocity of the animal at step 44. At step 52, the change in position or velocity of the animal is monitored to ascertain whether such change is a logical change, i.e. within normal parameters.

As the animal approaches within a predetermined distance of a programmed boundary 110 or 104, the relay rate may be adjusted accordingly, increasing, for example, from one sample per second upwards to ten samples per second. An adjust enable signal, at step 48, is transmitted by the remotely located control station 18 if the movement of animal 10 is determined to be logical by step 52. The location of the animal 10 is determined to be logical if the current location is less than a predetermined displacement from the previous location. Repeated determinations of illogical animal 10 displacements in either distance or velocity, at step 54, which are not caused by a satellite malfunction, as determined at step 58, are accumulated up to a predetermined, operator-selected threshold at step 62. Exceeding the operator selectable threshold causes, at step 66, activation of an audible or visual indication at the remotely located control station 18 informing the operator.

Similarly, if a change in animal location and speed are detected, at step 44, to be above a selected threshold and determined, at step 52, to be within the ability of the animal 10, the collar transceiver 14 receives a transmission rate adjust enable signal at step 48 from the remotely located control station 18 increasing the rate of relay to ensure accuracy of the animal 10 location determination. The speed of an animal 10 is determined to be logical if it is within the animal's 10 capability of movement, i.e. if the speed is less than a predetermined value. Alternatively, if the animal 10 is dormant or if a decrease in speed is detected, at step 44, the collar transceiver 14 receives a transmission rate adjustment enable signal at step 48 from the remotely located control station 18 to conserve collar transceiver 14 battery power by decreasing the rate of relay.

If the animal's change in position and velocity are determined to be normal, the remotely located control station 18 determines, at step 46, whether the animal 10 is seeking to breach a boundary from, for example, analysis of the aforementioned displacement and speed data. If the animal 10 is seeking escape, a stimulus enable signal step 50 is broadcast from the remotely located control station 18 to the collar transceiver 14. The stimulus enable signal activates the collar transceiver 14 to provide a correction stimulus, such as a mild shock or audible signal, to the animal 10. An alarm or indication at the remotely located control station 18 may be activated to alert an operator of a breach or potential egress from permissible confinement area 106.

A group of animals subject to the programmable electronic boundary system may be equipped with independently addressable collar transceivers 14 such that a unique level of stimulus may be communicated to individual animals by the remotely located control station 18. In this way, the stimulus enabled by the remotely located control station 18 is programmable to conform to the physical characteristics of each preselected animal (i. e. size, weight, etc). Similarly, the level of stimulus enabled by the remotely located control station 18 may further correspond to that animal's proximity to a programmed boundary 104 or 110. Thus, an animal that is closer to a boundary than a second animal may be subject to a greater degree of stimulus as enabled by the remotely located control station 18. Likewise, when two animals are both the same distance from the boundary, one animal, such as an aggressive dog, may receive a higher level of stimulus than another non-aggressive animal. The unique levels of stimulus for preselected animals having independently addressable collar transceivers 14, as well as variable boundary proximity stimuli, are input at the remotely located control station 18 and saved in the data configuration file.

DATA PROCESSING

The remotely located control station 18 is preferably a general purpose computer, such as a personal computer 22, including a microprocessor for the processing of positional satellite 16 data to determine the location of an animal 10 relative to the signals of positional satellites 16. Additionally, the remotely located control station 18 includes a data storage device for the storage of configuration files and tracking software and a communication device 20 for communication with the collar transceiver 14.

In a preferred embodiment, the remotely located control station 18 is a personal computer 22 having a communication port adapted to communicate between the personal computer 22 and collar transceiver 14 through communication device 20. Additionally, the remotely located control station 18 may communicate with an existing home automation system. Further, the personal computer 22 includes a modem 28 for connection to a satellite monitoring computer 30 which monitors the status of positional satellites 16. Upon relay of an indecipherable signal to the personal computer 22 by the collar transceiver 14 or portable programming transceiver 29, the personal computer 22 may contact the satellite monitoring computer 30 to determine the status of the positional satellites 16. If the minimum number of positional satellites 16 are not available for tracking, the satellite monitoring computer 30 disables the stimulus enable signal of the personal computer 22 and activates an alarm located at the personal computer 22 to indicate the failure of the system.

Management and communication software compatible with known operating environments such as the Windows® operating system is provided for use with the personal computer 22. The software enables the visual display of the overall confinement geometry 100 coordinates and the animal's 10 location relative to the overall confinement geometry 100. Configuration data files can be adjusted and edited utilizing the software of personal computer 22 to expand, contract or completely reconfigure the overall confinement geometry 100 or otherwise alter the parameters of the configuration data file.

The memory device of remotely located control station 18 may include volatile and non-volatile forms of computer memory. Preferably, data configuration files are stored in a non-volatile mass storage device such as a hard disk drive. Copies of data configuration files may be transported via portable memory media such as floppy disks, CD-ROMS, DAT's, etc.

In an alternative embodiment, the functions of the remotely located control station 18 are performed by the collar transceiver 14 eliminating the need for communication device 20 and remotely located control station 18. In this embodiment the collar transceiver 14 performs all calculations. Optionally, the remotely located control station 18 may be utilized to reconfigure or back-up configuration data files stored within the collar transceiver 14 through an optional serial or parallel transceiver or IR or optical communications port of collar transceiver 14. In this embodiment the collar transceiver 14 transmits an alarm enable to the remotely located control station 18 for audible or visual indication of a collar transceiver 14 failure or satellite system failure.

The terms and expressions which have been employed are used as terms of description and not of limitation. There is no intention in the use of such terms and expressions of excluding any equivalents of the features shown and described or portions thereof It is recognized, however, that various modifications are possible within the scope of the invention as claimed.

That which is claimed is:

1. An electronic containment system for at least one animal comprising:
   (a) at least one GPS source for producing a first transmitted signal having a first predetermined characteristic;
   (b) a portable transceiver for programming at least one containment perimeter of a predetermined area, the portable transceiver having,
      (i) a first receiver for receiving the first transmitted signal from the at least one GPS source;
      (ii) a first controller for producing a first control signal in response to the first transmitted signal received by the portable transceiver,
      (iii) a first transmitter for transmitting a second transmitted signal having a second predetermined characteristic in response to the first control signal produced by the first controller;
   (c) at least one transceiver, attached to at least one animal, the at least one transceiver having,
      (i) a second receiver for receiving the first transmitted signal from the at least one GPS source;
      (ii) a second controller for producing a second control signal in response to the first transmitted signal received by the at least one transceiver;

(iii) a second transmitter for transmitting a third transmitted signal having a third predetermined characteristic in response to the second control signal produced by the second controller, (d) a control station, remote from the portable transceiver, the control station having,
  (i) a third receiver for receiving the second transmitted signal produced by the portable transceiver;
  (ii) a forth receiver for receiving the third transmitted signal produced by the at least one transceiver;
  (iii) a third controller for producing a third control signal in response to the second transmitted signal and the third transmitted signal received by the control station;
  (iv) a third transmitter for transmitting a forth transmitted signal having a forth predetermined characteristic in response to the third control signal produced by the third controller.

2. The electronic containment system for at least one animal according to claim 1, the at least one transceiver further comprising:
  (a) a fifth receiver for receiving the forth transmitted signal from the control station;
  (b) a forth controller for producing a forth control signal in response to the first transmitted signal received by the at least one transceiver; and
  (c) a stimulus generator for producing a stimulus in response to the forth control signal.

3. The electronic containment system for at least one animal according to claim 1 wherein the first transmitted signal represents locational data.

4. The electronic containment system for at least one animal according to claim 1 wherein the first controller is a microprocessor.

5. The electronic containment system for at least one animal according to claim 1 wherein the first controller is an analog circuit.

6. The electronic containment system for at least one animal according to claim 1 wherein the first controller monitors the first transmitted signal and produces a first control signal that is representative of the portable transceiver location.

7. The electronic containment system for at least one animal according to claim 1 wherein the first controller monitors the first transmitted signal and produces a first control signal that is representative of an undetectable first transmitted signal.

8. The electronic containment system for at least one animal according to claim 1 wherein the system produces a warning alarm in response to the first control signal.

9. The electronic containment system for at least one animal according to claim 8 wherein the system produces the warning alarm at a predetermined location.

10. The electronic containment system for at least one animal according to claim 1 wherein the second transmitted signal is representative of the portable transceiver location.

11. The electronic containment system for at least one animal according to claim 1 wherein the second transmitted signal is a re-transmission of the first transmitted signal.

12. The electronic containment system for at least one animal according to claim 1 wherein the second transmitted signal is representative of a portion of the first transmitted signal.

13. The electronic containment system for at least one animal according to claim 1 wherein the control station is a personal computer.

14. The electronic containment system for at least one animal according to claim 1 wherein the third controller is a microprocessor.

15. The electronic containment system for at least one animal according to claim 1 wherein the third controller is an analog circuit.

16. The electronic containment system for at least one animal according to claim 1 wherein the third controller monitors the second transmitted signal and produces a third control signal that is representative of the portable transceiver location.

17. The electronic containment system for at least one animal according to claim 1 wherein the third controller monitors the second transmitted signal and produces a third control signal that is representative of an undetectable second transmitted signal.

18. The electronic containment system for at least one animal according to claim 1 wherein the control station is programmable.

19. The electronic containment system for at least one animal according to claim 1 wherein the control station can be programmed to store positional data representative of the at least one containment perimeter.

20. The electronic containment system for at least one animal according to claim 1 wherein the control station contains a graphical input device by which data defining the at least one containment perimeter may be entered.

21. The electronic containment system for at least one animal according to claim 1 wherein the at least one containment perimeter is programmed from the data sent by the portable transceiver in the second transmitted signal.

22. The electronic containment system for at least one animal according to claim 1 wherein the second controller is a microprocessor or an analog circuit.

23. The electronic containment system for at least one animal according to claim 1 wherein the third controller produces a third control signal representative of the at least one transceiver location relative to the at least one containment perimeter within a predetermined level.

24. The electronic containment system for at least one animal according to claim 1 wherein the third controller produces a third control signal representative of both the location of the at least one transceiver relative to the at least one containment perimeter within a predetermined level and the ground speed of the least one transceiver.

25. The electronic containment system for at least one animal according to claim 1 wherein the forth transmitted signal is representative of the at least one transceiver location relative to the at least one containment perimeter within a predetermined level.

26. The electronic containment system for at least one animal according to claim 1 wherein the forth transmitted signal is representative of the location of the at least one transceiver relative to the at least one containment perimeter within a predetermined level and the ground speed of the at least one transceiver.

27. The electronic containment system for at least one animal according to claim 1 wherein the at least one transceiver is responsive to the forth transmitted signal for the purpose of generating the stimulus.

28. The electronic containment system for at least one animal according to claim 1 wherein the control station comprises a display for displaying the location of the at least one transceiver.

29. The electronic containment system for at least one animal according to claim 1 wherein the control station comprises a nonvolatile memory for the storage of data defining the at least one containment perimeter.

30. The electronic containment system for at least one animal according to claim 29 wherein the nonvolatile memory is portable.

31. The electronic containment system for at least one animal according to claim 1 wherein the third transmitted signal contains identification information.

32. The electronic containment system for at least one animal according to claim 31 wherein the controller produces a forth control signal in response to the identification information in the third transmitted signal received by the at least one transceiver.

* * * * *